Sept. 16, 1969  K. E. PINARD  3,466,934
GYROSCOPE AND ITS METHOD OF MANUFACTURE
Filed April 20, 1967  2 Sheets-Sheet 1

INVENTOR.
KENNETH E. PINARD
BY
Davis, Hoxie, Faithfull & Hapgood
ATTORNEYS.

Sept. 16, 1969            K. E. PINARD            3,466,934

GYROSCOPE AND ITS METHOD OF MANUFACTURE

Filed April 20, 1967            2 Sheets-Sheet 2

INVENTOR.
KENNETH E. PINARD
BY
ATTORNEYS the United States Patent Office 3,466,934
Patented Sept. 16, 1969

3,466,934
GYROSCOPE AND ITS METHOD OF MANUFACTURE
Kenneth E. Pinard, Wolcott, Conn., assignor to The United States Time Corporation, Waterbury, Conn., a corporation of Connecticut
Filed Apr. 20, 1967, Ser. No. 632,271
Int. Cl. G01c 19/02
U.S. Cl. 74—5                                    10 Claims

ABSTRACT OF THE DISCLOSURE

Means and method of manufacturing a rate gyroscope which eliminates signal errors due to temperature variations. This is accomplished by winding the wires of the pickoff coils on a stator ring having protrusion and then applying a plastic potting material to hold the wires in place. Then inserting a ring of smaller diameter into the stator ring to hold the stator teeth in a particular position thus preventing any motion of the teeth due to temperature changes.

---

The present invention relates to gyroscopes and more particularly to a rate gyroscope mechanism and its method of manufacture. The mechanism aids in maintaining the stability of the signal derived from the gyroscope with changes in temperature.

A rate gyroscope is an instrument whose purpose is to provide information concerning changes of direction and the rate of such changes. Rate gyroscopes are widely used in guided missiles, aircraft and space activities, primarily for guidance.

Their use in such devices requires that they be small and lightweight, as space and weight are serious problems, particularly in the design of guided missiles. Such gyroscopes must be rugged, as they must often undergo severe shocks in taking-off, turning and landing. They must be reliable, even after receiving such shocks, as the entire missile or airplane may depend upon their proper functioning. And they should be accurate, because often the purpose of such gyros is guidance.

One of the major problems concerning such gyroscopes has been in maintaining their accuracy over a wide range of temperatures. A gyro which operates perfectly satisfactory at room temperature may be so inaccurate as to be useless in the cold found in space or when stored in the open in cold environments. Heat, for example from rocket motors or storage in the tropics, also causes inaccuracies.

Various methods and devices have been proposed and utilized to compensate for the temperature variations to which the gyroscope is subjected. One such method has been to use an external heater around the gyroscope. The heater and gyroscope are enclosed in an insulated jacket. This type of device adds to the weight and size of the gyroscope and, in addition, requires the use of power, which may be scarce. Such heaters can only compensate for cold and do not help against inaccuracies due to rises in temperature.

Another compensation scheme involves the use of external electrical circuitry which attempts to compensate the output signal of the gyroscope inversely to the changes induced in that signal from temperature changes. However, such circuitry utilizes power and space and is usually expensive. In addition, due to manufacturing tolerances in the gyroscope and in the circuitry, it is statistically improbable that an exact match will often occur. The alternative to random matching is to test each gyroscope and each circuit for their curves of temperature changes and to individually match each pair. This is time consuming and expensive. In addition, even with exact matching, there is no way to guard against the different effects of aging on the temperature response curves of the circuitry and the gyroscope.

A third solution has been to utilize special types of fluid, for fluid-damped gyroscopes, whose viscosity and volume are relatively constant under changes in temperature. Such fluids, although they aid in keeping the damping relatively stable, do not eliminate the problem of gyroscope inaccuracies due to temperature changes.

The signal variations in a gyroscope due to temperature changes in a gyroscope may be analyzed as consisting primarily of two types of errors. The first type is a "scale factor" error, that is, the output signal in the presence of an input rate varies due to temperature changes. This type of error is due primarily to temperature dependent changes in the resistance of the wire winding of the pickoff. The second type of change is a variation in the "zero offset" error, that is, the output signal varies with temperature changes from zero in the absence of an input rate (at the null position of the rotor of the pickoff). Ideally the output signal of the pickoff at its null position should be zero, regardless of the temperature.

It is the objective of the present invention to provide a method of manufacture of a rate gyroscope mechanism and the gyroscope produced thereby, which gyroscope mechanism protects the output signal at the null position of the pickoff from unwanted variations due to temperature changes, which mechanism is relatively simple and rugged, and which mechanism increases the strength and ruggedness of the gyroscope.

It is a further objective of the present invention that the method of manufacture and the mechanism produced thereby is relatively inexpensive, that the mechanism does not appreciably add to the weight or space requirements of the gyroscope, and that the mechanism does not consume any power.

In accordance with the present invention, the electromagnetic pickoff stator of the gyroscope is formed as a ring having internal protruding teeth. The wires forming the pickoff coils are wound in the spaces between the teeth. The wires may be held in place by plastic potting material. A smaller ring of relatively hard nonmagnetizable metal having protruding internal teeth is formed by machining. The teeth of the smaller ring are forced between the teeth of the stator. The ring portion of the smaller ring is then machined away, leaving its teeth. These teeth form tight individual wedged inserts between the teeth of the stator. These inserts prevent any motion of the stator teeth due to temperature changes. Preferably the inserts are of a material having substantially the same coefficient of expansion with temperature as the material forming the stator ring. It has been found that motion of the stator teeth relative to the rotor attached to the gimbal is the main cause of the gyro's drift of "zero offset," i.e., changes in signal output in the absence of an input rate signal due to changes in temperature. In addition, the complete wedging of the stator teeth adds to the physical strength and ruggedness of the stator. Other objectives and features of the present invention will be apparent from the detailed description of a preferred embodiment of said invention which follows, taken in conjunction with the accompanying drawings. Although a rate gyroscope is described, the present invention may be used with other similar inertial guidance devices including accelerometers.

Figure 1:
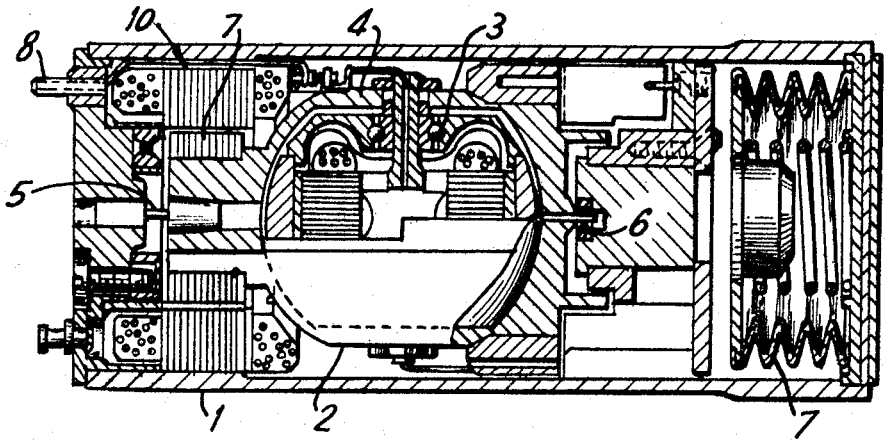
FIG. 1 is a side sectional view of the rate gyroscope of the present invention showing the relationship of its major components.

The gyroscope, as shown in FIG. 1, includes a cylindrical outer case 1 within which a rotor 2 is rotatably mounted. The rotor 2 is driven by an internal high-speed electric motor (not shown), but it may alternatively be gas or spring driven. The rotor 2 is mounted, by bearings 3, on a gimbal 4. The gimbal 4 is mounted at one end on a torsion bar 5 and at its other end on a bearing 6. The gyroscope includes an expandable bellows for taking up the space due to changes in volume of its viscous damping fluid.

One end of the gimbal 4 forms a magnetizable electrical pickoff rotor 7, preferably consisting of stacked plates or laminations of ferromagnetic metal having a plurality of external teeth. A pickoff stator 10 surrounds the magnetizable rotor 7. The pickoff rotor 7 and stator 10 cooperate to provide an electrical signal through lead 8. This signal is proportional to the movement of the rotor 7 and of the gimbal 4.

Figure 2:
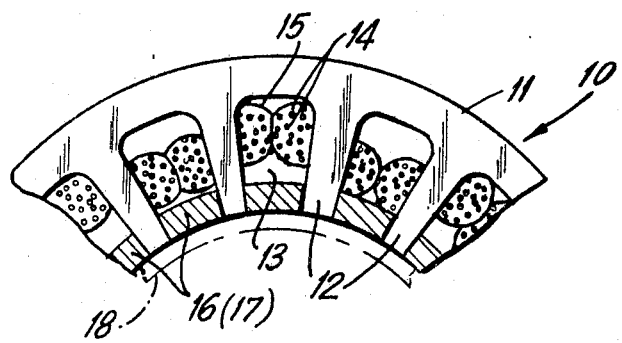
FIG. 2 is an enlarged front plan view of a portion of the stator.

The gyroscope's stator 10, as shown in FIG. 2, comprises a ring 11 of magnetic flux conducting metal. The ring has a plurality of inwardly protruding teeth 12. For example, as shown, the ring may be formed with sixteen teeth 12 which are evenly spaced. These teeth 12 form cavities 13 between them. If there are sixteen teeth 12, then there will be sixteen such cavities 13. The stator is formed from ferromagnetic metal laminations (plates) stacked along the axis of the ring. A large plurality of fine electrically conductive wires 14 formed into bundles 15 of wires having lead 8 are wound between the teeth 12 and within the cavities 13. For example, the wires may form the primary and secondary winding system of an electromagnetic microsyn pickoff system. After the wires are in place within the cavities, they are held in position by a potting compound, preferably an epoxy plastic resin.

In the present invention the spaces between the teeth 13, at their inner ends, are completely filled by wedged inserts 16. These inserts are of a hard metal, preferably harder than the metal of the stator. Hardness here means compression strength, i.e., resistance to physical distortion under compression, and does not refer to surface hardness. The inserts 16 do not conduct magnetic flux, i.e., they are non-magnetic. They have a low coefficient of expansion with temperature. Preferably the coefficient of expansion with temperature of the inserts is the same, or substantially the same, as the coefficient of expansion with temperature of the material of the ring 11. Preferably the metal of the inserts is relatively easy to machine. If there are sixteen teeth 12 in the stator, then there will be sixteen wedges 16. The preferred material for the wedges is a sintered powder metal of tungsten and copper alloy called "Mallory Elkonite type 10W-3," available from Mallory Metallurgical Company of Indianapolis, Ind. Its composition is 75% tungsten and 25% copper and its Rockwell hardness is 25C. It has a modulus of rupture of 150,000 p.s.i. and its value of theoretical coefficient of linear expansion at room temperature is $9.5-10 \times 10^{-6}/°C$.

Figure 3:
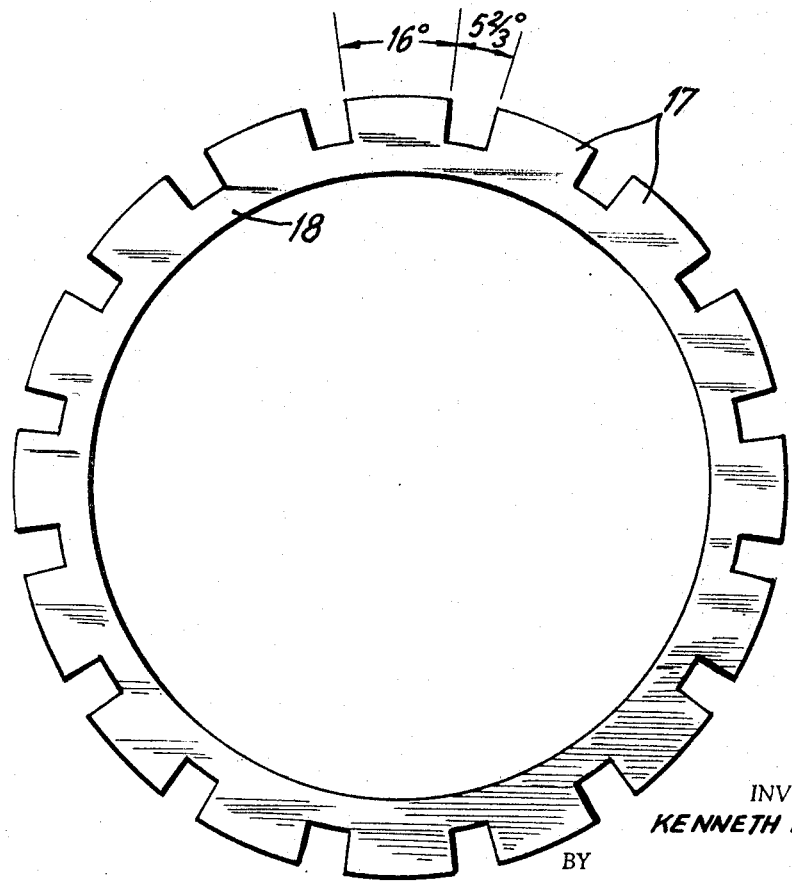
FIG. 3 is an enlarged front plan view showing the internal ring prior to its being machined.

The wedged inserts 16 may be each individually forced, one at a time, between the teeth. Preferably, however, the inserts are formed from the protruding outward teeth 17 of a ring 18, as is shown in FIG. 3. This method insures that the inserts are self-locating. Preferably the ring 18 is formed by cutting the slots (gaps between the teeth) from a larger solid ring with a cutter.

In the method of manufacture of the present invention, the wires 14 are wound between the stator teeth 12.

The broad external teeth 17 of the ring 18 are then forced between the teeth 12 of stator ring 11. This forcing may be accomplished by pressing the inner ring 18 down within the outer ring 11. Preferably the metal of the teeth (inserts) 17 is sufficiently hard as to its surface hardness to push away (shave off) excess metal of the stator. The wires are then potted with a plastic resin. When the ends of the two rings are in the same planes, the inner ring 18 is machined away, for example by cutters or by grinding. This leaves only the individual inserts 16 between each of the stator teeth 12.

This method of manufacture, by forcing the two rings into the same plane, self-locates each of the inserts and assures that each of the inserts is properly located.

Figure 4:
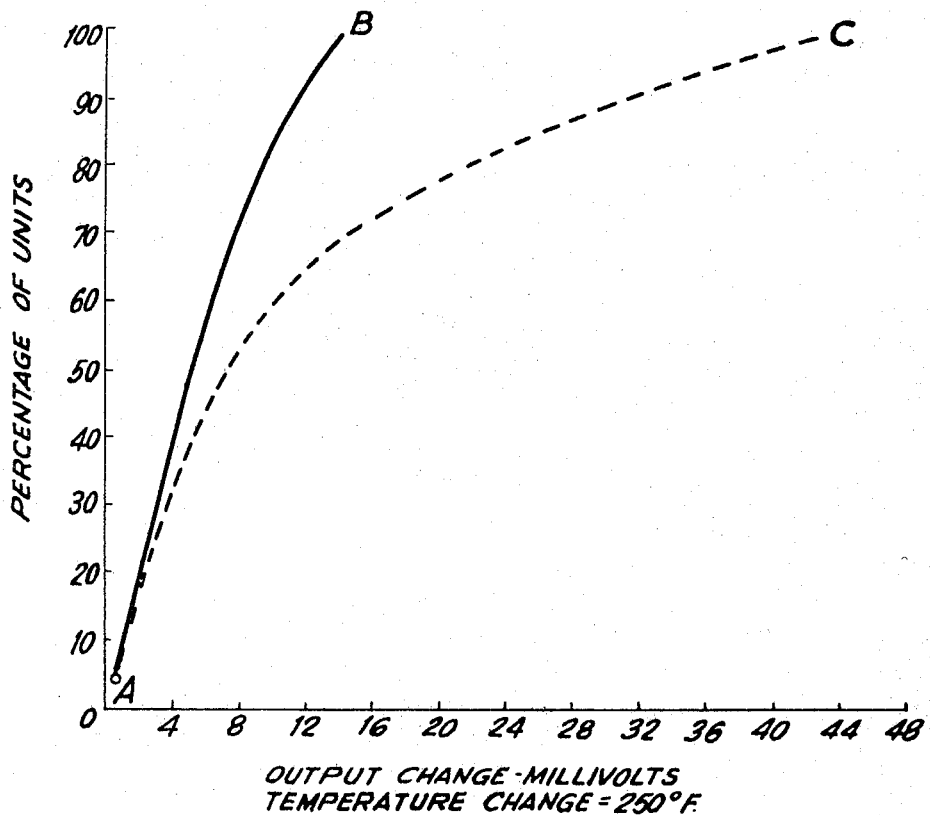
FIG. 4 is a descriptive chart comparing the performance of the gyroscope of the present invention as compared to other gyroscopes under conditions of change of temperature.

The inserts of the present invention, as shown in FIG. 4, aid in maintaining the signal output close to zero at the null position of the pickoff. In FIG. 4 the line A—B illustrates the response of a group of rate gyroscopes constructed in accordance with the present invention. The line A—C illustrates the response of the same type of gyroscope, but constructed without the inserts of the present invention. In each case, A—B and A—C, the temperature change was 250° F., from −65° to 185° F. The chart of the lines A—B and A—C is the percentage of units charted against the signal output change from the gyroscope in millivolts, at the null position of the gyroscope.

The structure of the present invention, by completely filling the space between the stator teeth, enables less fluid to be used in fluid-damped gyroscopes, thereby providing that less compensation is required for temperature changes in the fluid.

The present invention also provides other advantages. It provides a product presenting, in effect, a solid cylindrical surface of metal to the rotor. This surface is composed of inserts and the ends of the stator teeth. This metal surface, compared to one having potting compound at the surface, does not require hand cleaning. The inserts and stator teeth ends form a solid sturdy ring which is relatively easy to make circular. This solid ring retains its shape under pressure, for example, from clamps applied to the gyroscope case.

Another advantage is that the hard inserts push away any burrs on the stator teeth. In addition, the inserts free the gyroscope designer from the necessity of packing the same number of wires between each of the stator teeth in order to equalize pressure on the teeth. The designer may, using the structure of the present invention, wind the teeth unsymmetrically, for example with self-testing or torque coils.

Modifications may be made in the present invention within the scope of the subjoined claims. For example, the inserts may be made of other suitable materials, preferably a material having a thermal coefficient of expansion which is substantially the same as the material of the stator ring laminations.

I claim:
1. The method of manufacturing the stator of a gyroscope comprising the steps of:
   forming the stator body in the shape of a ring magnetizable metal having a plurality of protruding internal teeth;
   winding a plurality of wires between said internal teeth;
   forming a ring-shaped insert of a hard non-magnetizable metal having a low coefficient of expansion with temperature, said insert having protruding external teeth;
   forcing the said external teeth in the outer ends of the gaps between said internal teeth;
   potting said wires with a plastic resin; and
   machining away the ring portion joining said external teeth to leave said external teeth as individual inserts between said internal teeth of said stator.

2. The method of claim 1 wherein the stator is formed from a plurality of flat ferromagnetic metal sheets, said sheets being oriented perpendicularly to the axis of the stator ring.

3. A rate gyroscope including a case, a rotor within said case, means to rotate said rotor, a gimbal, a magnetizable rotor attached to said gimbal, and a pickoff stator around said magnetizable rotor, said stator including:
   a stator body formed of a ring member of magnetizable metal and having a plurality of internal teeth;
   a winding composed of a plurality of wires wound between said internal teeth;
   a potting compound positioned around said wires and between said internal teeth; and
   a plurality of hard metal inserts between each of said internal teeth, said inserts composed of a hard nonmagnetizable metal having a low coefficient of expansion with temperature, said inserts being tightly wedged between said teeth.

4. A rate gyroscope as in claim 3 wherein the stator body is formed from a plurality of ferromagnetic metal plates, said plates being oriented in the plane perpendicular to the axis of the stator.

5. A rate gyroscope as in claim 3 wherein said inserts are substantially comprised of sintered copper and tungsten.

6. A rate gyroscope as in claim 3 wherein said inserts and the inside edges of said internal teeth form the internal cylindrical surface of said stator.

7. A rate gyroscope as in claim 3 wherein the potting compound is a plastic resin.

8. A rate gyroscope stator being an intermediate product of manufacture and including:
   a stator body comprising a first ring of magnetizable metal having internal protruding teeth;
   a winding comprising a plurality of wires wound within the gaps of said internal teeth;
   a second ring of hard nonmagnetizable metal having a low coefficient of expansion with temperature and having external protruding teeth, said external teeth completely filling the space between the ends of said internal teeth of said stator.

9. A rate gyroscope as in claim 8 wherein the stator is composed of a plurality of stacked sheets of ferromagnetic metal, said sheets being stacked along the axis of said stator.

10. A rate gyroscope as in claim 8 wherein said second ring is substantially composed of sintered tungsten and copper.

References Cited
UNITED STATES PATENTS

| | | | |
|---|---|---|---|
| 3,218,872 | 11/1965 | Swainson | 74—5.6 |
| 3,225,607 | 12/1965 | Schaberg et al. | 74—5.6 |
| 3,252,339 | 5/1966 | Huang | 74—5.6 |

C. J. HUSAR, Primary Examiner